(12) United States Patent
Sugano

(10) Patent No.: US 6,646,711 B2
(45) Date of Patent: Nov. 11, 2003

(54) METHOD FOR MANUFACTURING DISPLAY PANEL HAVING REDUCED WALL THICKNESS AND DISPLAY PANEL HAVING REDUCED WALL THICKNESS

(75) Inventor: Yukiyasu Sugano, Kanagawa (JP)

(73) Assignee: Sony Corporation, Tokyo (JP)

( * ) Notice: Subject to any disclaimer, the term of this patent is extended or adjusted under 35 U.S.C. 154(b) by 65 days.

(21) Appl. No.: 09/951,641

(22) Filed: Sep. 13, 2001

(65) Prior Publication Data

US 2002/0067459 A1 Jun. 6, 2002

(30) Foreign Application Priority Data

Sep. 14, 2000 (JP) .......................................... 2000-280363

(51) Int. Cl.⁷ .......................... G02F 1/13; G02F 1/1333; C03C 15/00
(52) U.S. Cl. .......................... 349/187; 349/158; 216/84; 216/103
(58) Field of Search ................................. 349/158, 187; 216/84, 103; 374/7, 5, 3

(56) References Cited

U.S. PATENT DOCUMENTS 6,197,209 B1 * 3/2001 Shin et al. .................... 216/84

\* cited by examiner

Primary Examiner—Tarifur R. Chowdhury
(74) Attorney, Agent, or Firm—Sonnenschein, Nath & Rosenthal LLP

(57) ABSTRACT

The weight and thickness reduction of a display panel can be realized without reducing the substrate size and lowering the productivity. To produce a display panel, there are performed a panel producing step for manufacturing a display panel using substrates each having a predetermined wall thickness; and a chemical treatment step for immersing the display panel into a chemical solution and removing a fixed amount of the surface of the substrates by a chemical reaction so as to reduce the wall thickness, wherein in the panel producing step, the display panel is produced by forming an electroluminescence element on one substrate having a predetermined thickness, and in the chemical treatment step, the display panel is immersed into the chemical solution while the electroluminescence element is protected.

30 Claims, 6 Drawing Sheets

METHOD FOR MANUFACTURING DISPLAY PANEL HAVING REDUCED WALL THICKNESS AND DISPLAY PANEL HAVING REDUCED WALL THICKNESS

BACKGROUND OF THE INVENTION

1. Field of the Invention

The present invention relates to a method for manufacturing a display panel. More specifically, the present invention relates to a technique for making a flat display panel typical of a liquid crystal display using a glass substrate thinner and lightweight.

2. Description of the Related Art

Recently, with an increase in the demand for a display panel such as a liquid crystal display in a mobile application, there has been a growing need to make the display panel thinner and lightweight. A glass substrate takes up large amounts of thickness and weight in the display panel. To make the display panel thinner and lightweight, the glass substrate must be thin. When focusing on a large liquid crystal display, the thickness of the glass substrate has been reduced from 1.1 mm to 0.7 mm in recent years. In this case, the thickness of the glass substrate has been simply reduced to be introduced into the assembling process, so that the production line has not been required to be changed largely. It is considered that the thickness of 0.7 mm can correspond to a display panel having a diagonal substrate size of up to 1 m.

However, the need for making the substrate thinner is increased in the mobile application. The substrate thickness in the next stage is assumed to be 0.5 mm. When the thickness of the glass substrate is reduced to 0.5 mm, the deformation is increased. For example, considering the glass substrate having a size of 600 mm×700 mm, the thickness cannot correspond to the current production and carrying techniques. For this reason, it is considered that when the size of the substrate is reduced to 400 mm×500 mm so as to restructure the production line. However, when the size of the substrate is reduced, the number of liquid crystal panels as final products obtained for each substrate, thereby lowering the productivity greatly. In addition, there is an attempt to make the display panel thinner by assembling a thick substrate into the display panel so as to mechanically polish the surface of the glass substrate. In the mechanical polishing method, however, after the large substrate is assembled so as to be cut out to a plurality of panels, the individual panels are subject to mechanical polishing, thereby lowering the productivity. As described above, when attempting to introduce the thin substrate in the beginning of the production line, the substrate size cannot be increased without limitation due to the influence of the deformation of the substrate. When attempting to make the substrate assembled into the panel thinner by polishing, the panels are removed from the substrate one by one, and then, are polished. Long time is then required so as to lower the productivity.

SUMMARY OF THE INVENTION

In view of the foregoing problems of the prior art, an object of the present invention is to provide a producing method for realizing the weight and thickness reduction of a display panel without reducing the substrate size and lowering the productivity. To achieve such an object, the following measures are taken. A method for manufacturing a display panel according to the present invention comprises a panel producing step for manufacturing a display panel using substrates each having a predetermined wall thickness; and a chemical treatment step for immersing the display panel into a chemical solution and removing a fixed amount of the surface of the substrates by a chemical reaction so as to reduce the wall thickness. Preferably, in the chemical treatment step, the temperature change of the chemical solution is controlled so as to be within the range from a predetermined temperature to ±5° C., thereby removing a fixed amount of the surface of the substrates. In this case, in the chemical treatment step, a predetermined temperature of the chemical solution is between 30° C. and 60° C. In the chemical treatment step, the concentration change of the chemical solution is controlled so as to be within the range from a predetermined concentration to ±5 wt %, thereby removing a fixed amount of the surface of the substrates. In this case, in the chemical treatment step, a predetermined concentration of the chemical solution is between 10 wt % and 30 wt %. In the chemical treatment step, a substance precipitated by the chemical reaction is recovered from the chemical solution, thereby removing a fixed amount of the surface of the substrates. In the chemical treatment step, the display panel is immersed into the chemical solution while circulating the chemical solution filled in a vessel, thereby removing a fixed amount of the surface of the substrates. In the chemical treatment step, the display panel is immersed into the chemical solution while introducing bubbles into the chemical solution for stirring, thereby removing a fixed amount of the surface of the substrates. In the chemical treatment step, the display panel is immersed into the chemical solution while swinging, thereby removing a fixed amount of the surface of the substrates. Between the panel producing step and the chemical treatment step, a foreign particle removing step for removing foreign particles deposited onto the substrates is performed. In this case, in the foreign particle removing step, ozone water is exerted on the substrates to remove foreign particles. After the chemical treatment step, pure water heated to 40° C. or higher is used to perform a chemical solution removing step for removing the chemical solution deposited onto the substrates. The chemical treatment step includes a procedure for detecting whether a fixed amount of the surface of the substrates is removed or not. In the chemical treatment step, the substrates made of glass are immersed into a chemical solution containing hydrofluoric acid and sulfuric acid, thereby removing a fixed amount of the surface thereof. In the panel producing step, a display panel is produced by superposing two substrates each having a predetermined wall thickness together by a predetermined gap, and after the chemical treatment step, a liquid crystal implanting step for implanting liquid crystals into the gap of the display panel is performed. Otherwise, in the panel producing step, a display panel is produced by forming an electroluminescence element on one substrate having a predetermined wall thickness, and in the chemical treatment step, the display panel is immersed into the chemical solution while the electroluminescence element is protected, thereby removing a fixed amount of the surface of the substrate.

According to the present invention, for example, after two substrates constructing a display panel are combined with each other, these substrates are immersed into a chemical solution, thereby removing a fixed amount of the surface of the substrates surface by a chemical reaction. Since the individual display panels are processed together before being cut out from a large substrate, the productivity cannot be lowered. In the assembling stage, since a thick substrate is used to advance the producing process, any handling problem will not arise when the substrate is increased. Since the thickness of the substrate is reduced constantly over the entire surface, the temperature of the chemical solution for use in the chemical reaction is adjusted within ±5° C. in the present invention. In the similar object, the variation of the concentration of the chemical solution is adjusted within the range of ±5 wt %. Since re-deposition of the substance generated during the chemical reaction interferes with uniform removal of the wall thickness, a measure for preventing the re-deposition is taken. For example, during immersion of the substrate, a filter is used to recover the substance precipitated by the chemical reaction. The chemical solution is circulated during the treatment. A gas is mixed into the chemical solution so that the bubbling acts on the substrate. In addition, during the treatment, the substrate being immersed can be swung. To perform the chemical treatment uniformly, between the step for superposing the substrates together and the step for chemically etching the substrate, a step for removing foreign particles deposited onto the substrate is added. In the foreign particle removing step, organic foreign particles are removed using, for example, highly oxidative ozone water. In a rinsing step for removing the chemical solution deposited onto the substrate, hot pure water at 40° C. or higher is used as a rinsing liquid to facilitate drying. During or after immersion of the substrate, removal of a predetermined amount is monitored to quantitatively control the thickness of the substrate.

In the method for manufacturing a display panel according to the present invention, the surface of a substrate is subject to a semiconductor process to form a pixel array, and then, the substrate superposed together with other substrate or a protective member is immersed into a chemical solution to etch the surface of the substrates by a chemical reaction. The semiconductor process can be performed to the surface of the thick substrates. A chemical reaction process is simply added to the current display panel producing process so as to obtain a thin and lightweight display panel. In the producing method according to the present invention, the panel is immersed into a chemical solution so as to remove a fixed amount of the surface of the substrates by a chemical solution. The substrates can be batch-processed. For this reason, a chemical solution tank is increased, 20 large substrates of about 600 mm×700 mm can be processed per hour. There is adaptability as mass production equipment.

DESCRIPTION OF THE PREFERRED EMBODIMENTS

Figure 1:
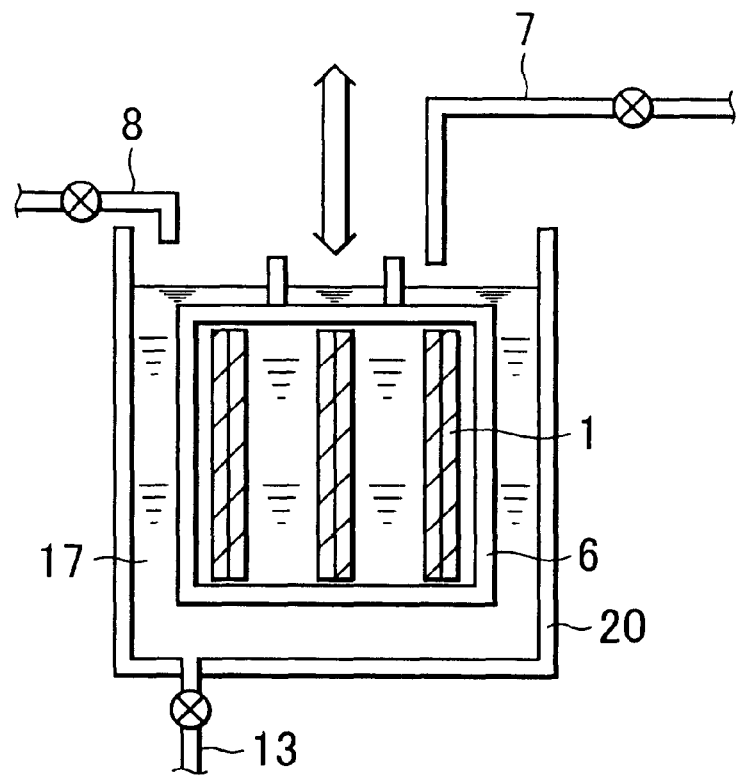
FIG. 1 is a schematic diagram showing a first embodiment of a method for manufacturing a display panel according to the present invention.

Embodiments of the present invention will be described in detail hereinbelow with reference to the drawings. FIG. 1 schematically shows one example of a first embodiment of a method for manufacturing a display panel according to the present invention. Specifically, it schematically shows a device for realizing the method for manufacturing a display panel according to the present invention. As is illustrated, this device is basically a vessel 20 in which a chemical solution 17 is filled. Into the chemical solution 17, a cassette 6 equipped with a panel 1 to be processed can be introduced. The cassette 6 can be swung in the vessel 20 up and down, as indicated by the arrow. The chemical solution 17 containing hydrofluoric acid can be introduced into the vessel 20 through an HF supply line 7. Pure water can be also introduced into the vessel 20 through a pure water supply line 8. A discharge line 13 is connected to the bottom of the vessel 20 so as to discharge the chemical solution 17 used. As is illustrated, in the producing method of the present invention, after large substrates are superposed together to produce the panel 1, the panel 1 is placed in the cassette 6, and is then immersed into the vessel 20 filled with the chemical solution 17 so as to remove a fixed amount of the surface of the substrates. Hydrofluoric acid (HF) is used as the chemical solution 17, and the concentration is set to 20 wt %. The size of the vessel 20 is 700 mm×700 mm×900 mm.

Figure 2:
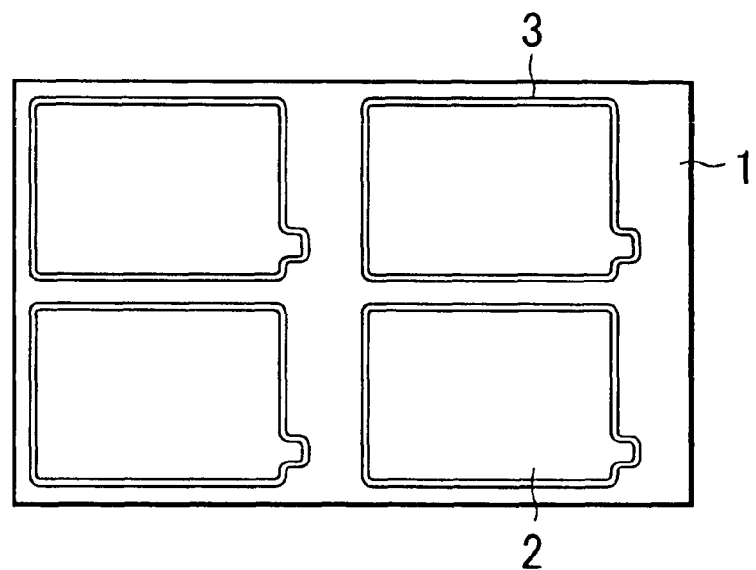
FIG. 2 is a plan view showing an example of a panel before being processed in the first embodiment.

FIG. 2 shows a state that two substrates are superposed together to assemble the panel 1. The size of the glass substrate is 600 mm×720 mm. For example, 7059 manufactured by Corning can be used. The two glass substrates are adhered to each other by a sealing agent 3. A portion surrounded by the sealing agent 3 is a display region 2. After a fixed amount of the wall thickness of the glass substrate is removed by a chemical treatment, the panel 1 is cut for each of the display regions 2, to finally obtain four display panels in this embodiment. In this embodiment, the sealing agent 3 surrounding the display region 2 is closed completely, so that a chemical solution cannot be included into the display region 2. The sealing agent 3 is coated by a dispenser. It is thus easy to edit a program for auto-control and to coat the sealing agent 3 along the closed pattern. A thermosetting resin such as an epoxy resin is used as the sealing agent 3. The epoxy resin has etching resistance to HF. When the panel 1 is immersed into HF, the display region 2 can be protected.

Figure 3:
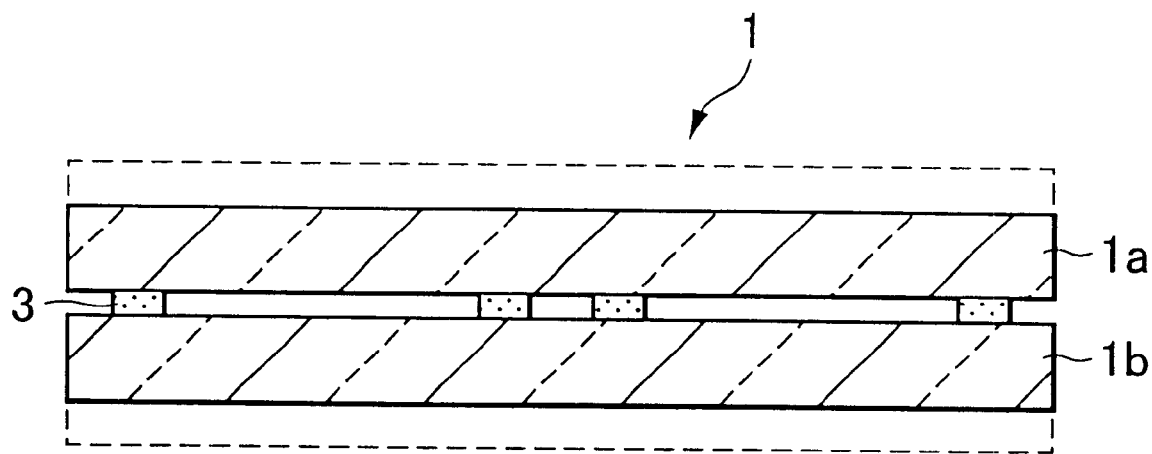
FIG. 3 is a cross-sectional view showing a panel after being processed in the first embodiment.
Figure 4:
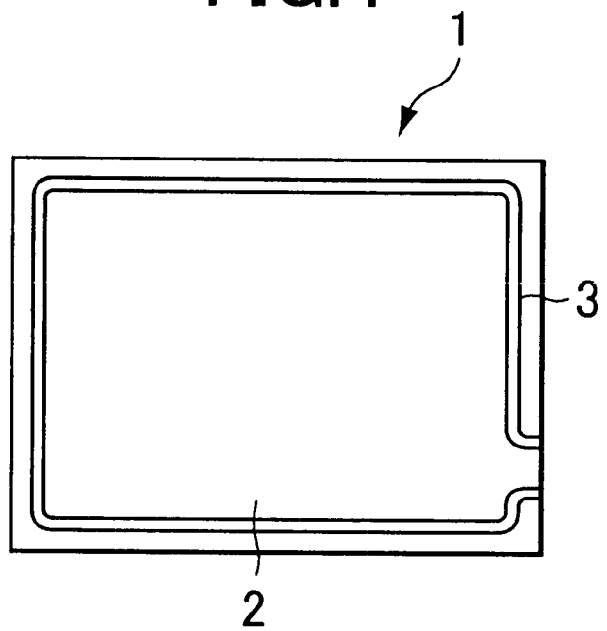
FIG. 4 is a plan view showing the final state of the panel produced in the first embodiment.

FIG. 3 is a schematic cross-sectional view showing the panel after a chemical treatment. As is illustrated, the panel 1 is constructed so that a pair of substrates 1a and 1b is superposed together by the sealing agent 3. After the substrates 1a and 1b made of glass are superposed together, the panel 1 is immersed into a reaction tank containing HF to etch the glass surface. The time is 60 minutes. As indicated by the dotted line, a fixed amount of the wall thickness is removed from the surface of both substrates 1a and 1b. One hour later, HF in the tack is discharged to fill pure water in the tack, thereby rinsing the substrate surface. The rinsing time is 5 minutes. After drying, the in-plane thickness of the panel 1 is measured. Before the treatment, for 25 in-plane thicknesses, the average value is 1.410 mm, and the distribution is 0.016 mm. After the treatment, the average value is 1.008 mm, and the distribution is 0.036. In-plane uniformity without problems can be obtained as the display panel.

After the etching processing, the panel with the large substrates superposed together is scribed and broken, and then, is cut out for each display panel x, as shown in the drawing. At this time, part of the sealing agent 3 surrounding the display region 2 of the display panel x is separated at the filling port. After the braking, liquid crystals are implanted from the filling port to adhere a polarizer, thereby displaying an image. Good display without fogging, irregularities and pixel defects can be obtained.

As described above, in the method for manufacturing a display panel according to the present invention, there are performed a panel producing step for manufacturing the display panel 1 using the substrates 1a and 1b each having a predetermined wall thickness and a chemical treatment step for immersing the display panel 1 into the chemical solution 17 and removing a fixed amount of the surface of the substrates 1a and 1b by a chemical reaction so as to reduce the wall thickness. In the chemical treatment step, the temperature change of the chemical solution 17 is controlled so as to be within the range from a predetermined temperature to ±5° C., thereby removing a fixed amount of the surface of the substrates 1a and 1b. The in-plane variation of the thickness of the display panel can be uniform. A predetermined temperature of the chemical solution is between 30° C. and 60° C. Preferably, it is 40±5° C. More preferably, it is 40±2° C. When it is below 30° C., the etching rate of the glass is low. When it is above 60° C., the in-plane uniformity of etching can be adversely affected. In the chemical treatment step, the concentration change of the chemical solution 17 is controlled so as to be within the range from a predetermined concentration to ±5 wt %, thereby removing a fixed amount of the surface of the substrates 1a and 1b. The in-plane variation of the thickness of the glass substrate can be controlled. A predetermined concentration of the chemical solution is between 10 wt % to 30 wt %. When it is below 10 wt %, the etching rate is low. When it is above 30 wt %, irregularities can be caused in the etching. Preferably, in the chemical treatment step, a substance precipitated by the chemical reaction is recovered from the chemical solution, thereby removing a fixed amount of the surface of the substrates. For example, when the glass substrate is processed by HF (hydrofluoric acid), a reaction product may be precipitated by the chemical reaction. When the reaction product precipitated is re-deposited onto the substrate surface, etching irregularities will be caused. Using a filter, the precipitation substance is preferably recovered from the chemical solution. In the chemical treatment step, the panel 1 is immersed into the chemical solution 17 while circulating the chemical solution 17 filled in the vessel 20, thereby removing a fixed amount of the surface of the substrates 1a and 1b. This can prevent re-deposition of the precipitated substance. In the chemical treatment step, the panel 1 is immersed into the chemical solution while introducing bubbles such as nitrogen gas into the chemical solution 17 for stirring, thereby removing a fixed amount of the surface of the substrates 1a and 1b. This can prevent re-deposition of the precipitated substance. From the same reason, the panel 1 is immersed into the chemical solution 17 while swinging, thereby removing a fixed amount of the surface of the substrates 1a and 1b. Preferably, between the panel producing step and the chemical treatment step, a foreign particle removing step for removing foreign particles deposited onto the substrates 1a and 1b is performed. The foreign particle removing step, for example, exerts ozone water on the substrates 1a and 1b, thereby removing organic foreign particles by oxidation. The foreign particles are removed before the chemical treatment step so as to perform etching uniformly. After the chemical treatment step, preferably, pure water heated to 40° C. or higher is used to remove the chemical solution deposited onto the substrates 1a and 1b. Using the hot pure water, drying after rinsing can be easily done. Preferably, the chemical treatment step includes a procedure for detecting whether a fixed amount of the surface of the substrates 1a and 1b is removed or not. In a preferred embodiment, in the chemical treatment step, the substrates made of glass are immersed into a chemical solution containing hydrofluoric acid (HF) and sulfuric acid, thereby removing a fixed amount of the surface thereof. Using sulfuric acid in addition to hydrofluoric acid, the amount of the substance precipitated by the chemical reaction can be suppressed. In other words, sulfuric acid is found to have the effect for suppressing aggregation of the reaction product.

Figure 5:
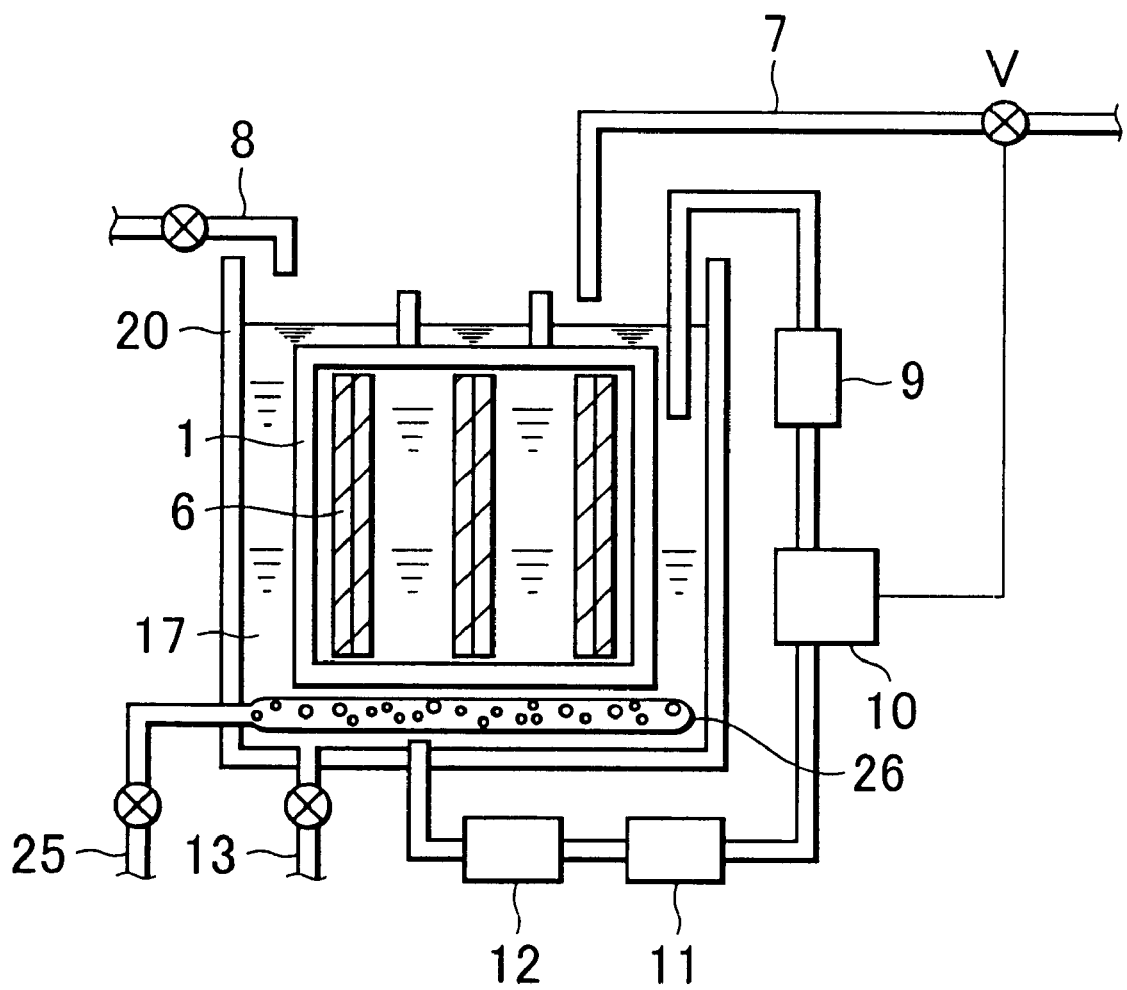
FIG. 5 is a schematic diagram showing a second embodiment of the method for manufacturing a display panel according to the present invention.

FIG. 5 shows one example of a second embodiment of the method for manufacturing a display panel according to the present invention, and schematically shows a device for realizing this producing method. To facilitate understanding, parts corresponding to a chemical reactor (an etching device) shown in FIG. 1 are indicated by the same reference numerals. As is illustrated, in this embodiment, the chemical solution 17 can be circulated in the vessel 20. In addition to a concentration adjustment function using an HF concentration meter 10, there are provided a filter 11, a heater 12, and an N2 supply line 25. As in the first embodiment, the cassette 6 can be swung up and down during the treatment. HF is used as the chemical solution 17, and the concentration is 20 wt %. The size of the vessel 20 is 700 mm×700 mm×900 mm, as in the first embodiment shown in FIG. 1.

For the circulation function of the chemical solution 17, the chemical solution 17 is circulated by a pump 9 at a flow rate of 10 litters per minute. For the concentration, the HF concentration meter 10 is mounted on the circulation line. When the concentration is 18 wt %, an undiluted solution of 49 wt % is supplied from the HF supply line 7. The undiluted solution is supplied until the value of the concentration meter 10 is 22 wt %, and then, a valve v is closed. In this embodiment, the concentration is controlled so as to be the range of ±2 wt %. When it is controlled so as to be the range of ±5 wt %, the etching irregularities can be suppressed to some extent. The filter 11 is mounted halfway in the circulation line. The diameter of the filter is 0.5 μcm. This can filter the substance generated by the chemical reaction. The heater 12 is mounted to raise the temperature for etching. The temperature is set to 40° C. The value of the thermometer, not shown, mounted on the vessel 20 is fed back to the heater 12, so that the temperature is controlled to be 40±2° C. When the setting temperature is controlled in the range of ±5° C., the etching irregularities of the substrate surface can be released to some extent. A bubble generator 26 is mounted on the bottom of the vessel 20 as a chemical solution tank to provide a function in which N2 is sent therein from the N2 supply line 25 for bubbling. This can prevent re-deposition of the reaction product. A robot, not shown, for introducing the cassette 6 into the vessel 20 is provided with a function for swinging the cassette 6 up and down during etching. The cassette 6 is swung up and down at a distance of 10 cm from each other during etching, and is moved up and down at an interval of 30 cycles/min.

The same panel as that of the first embodiment is used to immerse the panel into a processing tank shown in FIG. 5, thereby etching the surface. The time is one hour as in the first embodiment. One hour later, HF in the tack is discharged to fill pure water in the tack, thereby rinsing the substrate surface. The rinsing time is 5 minutes. After drying, the in-plane thickness of the substrate is measured. Before the treatment, for 25 in-plane thicknesses, the average value is 1.408 mm, and the distribution is 0.018 mm. After the treatment, the average value is 0.924 mm, and the distribution is 0.020. The in-plane distribution can be further improved as compared with the first embodiment. In-plane uniformity without problems can be obtained as the display panel.

Figure 6:
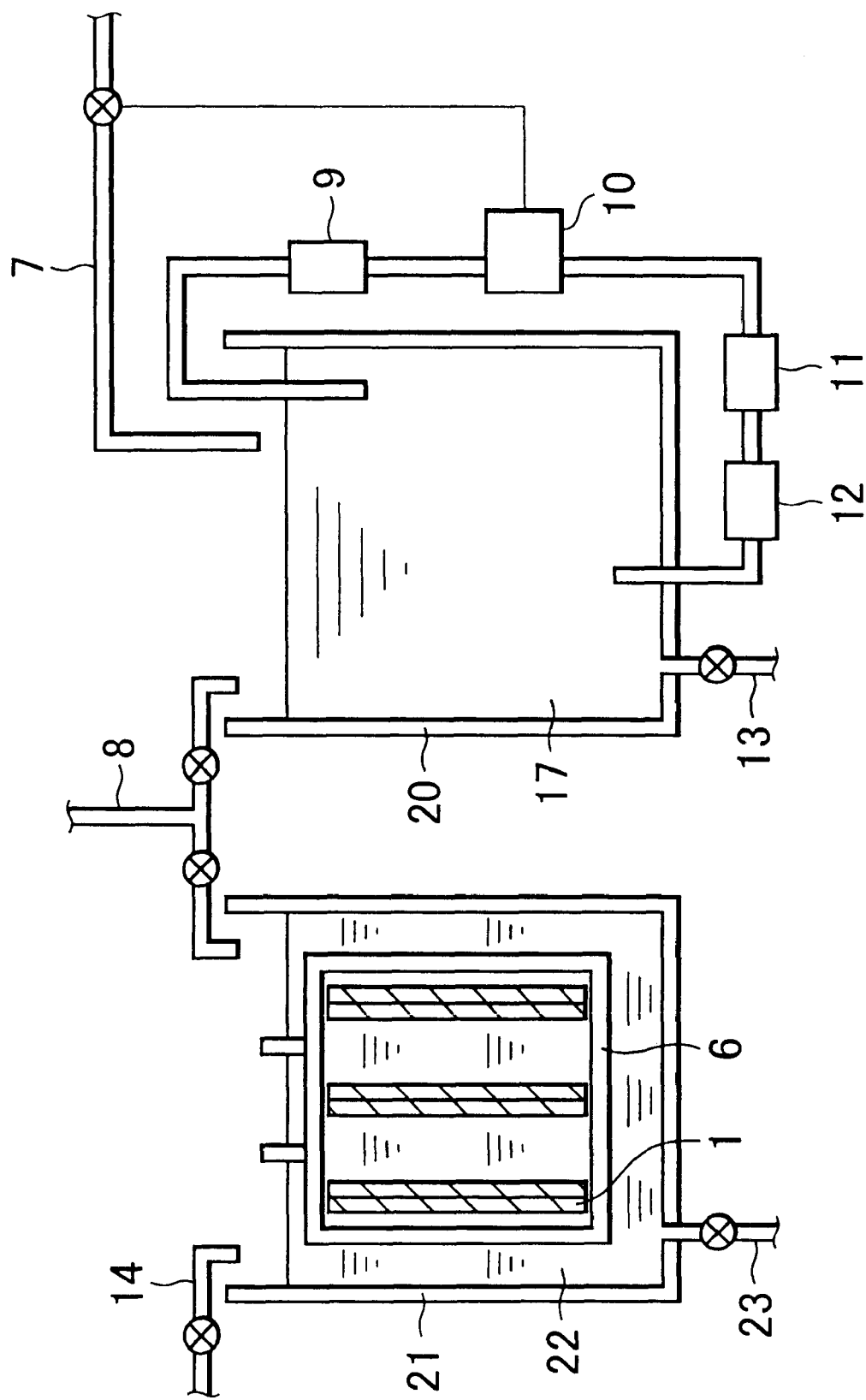
FIG. 6 is a schematic diagram showing a third embodiment of the method for manufacturing a display panel according to the present invention.

FIG. 6 is a schematic diagram showing one example of a third embodiment of the method for manufacturing a display panel according to the present invention, and schematically shows a device construction for realizing this producing method. To facilitate understanding, parts corresponding to the device shown in FIG. 5 are indicated by the same reference numerals. This embodiment is provided with a vessel 21 as a rinsing tank is added to the vessel 20 as an HF tank for etching the substrate surface. The rinsing tank is provided with the pure water supply line 8 and an ozone water supply line 14. An ozone supply device for supplying ozone water is provided to supply ozone water to the rinsing tank. The concentration of the ozone water is 10 ppm. The pure water supply line 8 and the ozone water supply line 14 respectively have a supply ability of 10 litters per minute. During treatment of the substrate in the HF tank, a chemical solution 22 in the rinsing tank can be replaced. As in the second embodiment, the HF tank is provided with the HF concentration meter 10 for adjusting the concentration, the filter 11, the heater 12, a nitrogen supply line, not shown, and a cassette swinging mechanism, not shown, so as to permit the same treatment as that of the second embodiment. HF is used as the chemical solution and the concentration is 20 wt %. The size of the rinsing tank is 700 mm×700 mm×900 mm as in the first embodiment. In the treatment, the panel is first dipped into the ozone water in the rinsing tank, and then, is etched in the HF tank. The panel is returned to the rinsing tank so as to be rinsed with pure water.

The time for immersion to the ozone water is 20 minutes. This can remove organic foreign particles such as oil or dust deposited onto the panel surface by oxidation. After the ozone treatment, the cassette 6 is moved to the HF tank to etch the substrate surface. In the etching processing, the concentration adjustment function, the filter, the heater, the nitrogen supply line, and the cassette swinging line are used, and is the same as that of the second embodiment. The time is set to one hour likewise. After the HF treatment, the cassette 6 is moved to the rinsing tank so as to be rinsed with pure water. The rinsing tank is previously filled with pure water after the ozone water is discharged after the ozone treatment. The rinsing processing is done in the rinsing tank for 5 minutes. Thereafter, the drying processing is done to measure the in-plane thicknesses of the substrate. Before the treatment, for 25 in-plane thicknesses, the average value is 1.405 mm, and the distribution is 0.014 mm. After the treatment, the average value is 0.902 mm, and the distribution is 0.018. In-plane uniformity without problems can be obtained as the display panel. Slight light scattering on the substrate surface is observed in the first and second embodiments, but it is not observed in this embodiment. It is considered that the effect for previously removing foreign particles from the substrate surface by the ozone water treatment appears.

Figure 7:
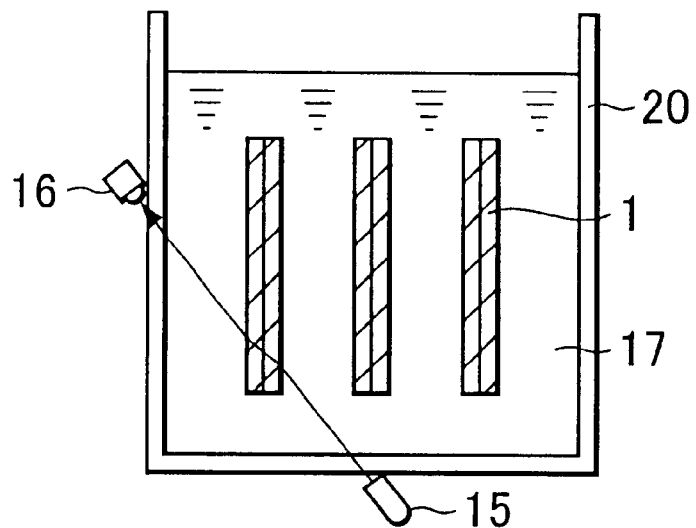
FIG. 7 is a schematic diagram showing a fourth embodiment of the method for manufacturing a display panel according to the present invention.

FIG. 7 is a schematic diagram showing one example of a fourth embodiment of the method for manufacturing a display panel according to the present invention, and schematically shows a device for realizing this producing method. In this embodiment, a HeNe laser 15 and a detector 16 therefor are mounted outside the vessel 20 as an HF tank for etching the surface of the panel 1. A light flux emitted from the HeNe laser 15 is radiated to the panel 1 at an angle of 30°, and the laser light passing through the panel 1 enters in the detector 16. When the laser light is radiated to the substrate of the panel 1, it is refracted to change the light path. The detector 16 is positioned so as to capture the laser light refracted just when the thickness of the substrate is 1.0 mm.

Figure 8:
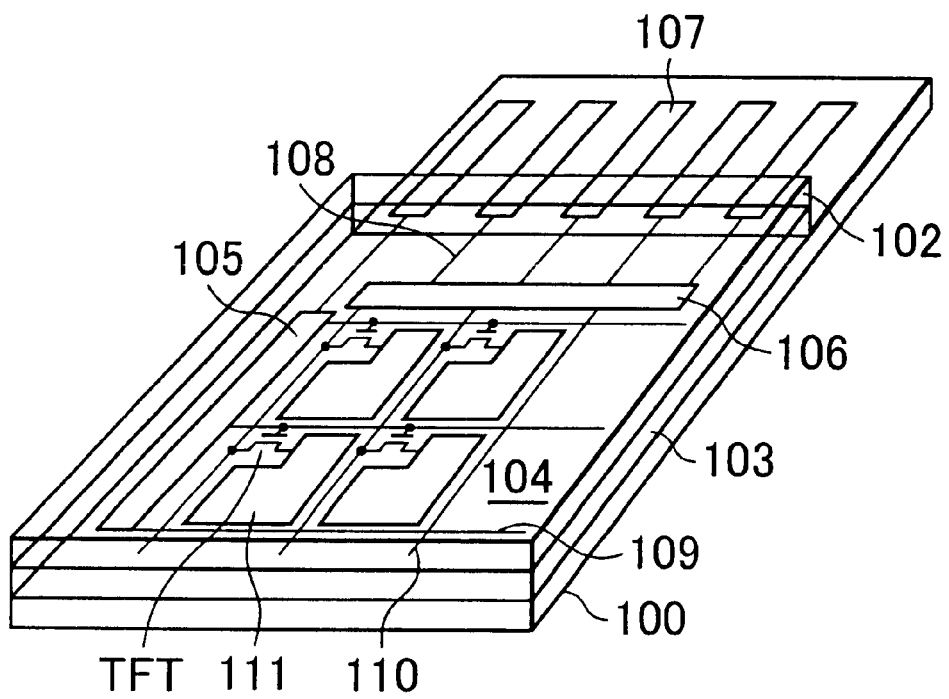
FIG. 8 is a perspective view showing one example of the display panel produced in accordance with the present invention.

As in the second embodiment described above, the panel 1 is immersed for etching. A thickness sensor consisting of the HeNe laser 15 and the detector 16 is actuated after a lapse of 48 minutes and 30 seconds. Then, HF is discharged to perform the rinsing and drying processes as in the second embodiment. After the processes, the thickness of a portion onto which the laser light is radiated is measured. It is 0.998 mm. In the in-plane uniformity after the treatment, the average value is 1.004 mm, and the distribution is 0.019. In-plane uniformity without problems can be obtained as the display panel. Slight FIG. 8 is a schematic perspective view showing one example of the display panel produced in accordance with the present invention. This embodiment is a liquid crystal display device produced by superposing a pair of substrates together. As is illustrated, this display device has a panel construction provided with a pair of insulating substrates 100 and 102 and an electro-optic substance 103 held between both. A liquid crystal material is used as the electro-optic substance 103. The lower insulating substrate 100 is integratedly formed with a pixel array part 104 and a driving circuit part. The driving circuit part is divided into a vertical driving circuit 105 and a horizontal driving circuit 106. The upper end of the peripheral portion of the insulating substrate 100 is formed with a terminal part 107 for external connection. The terminal part 107 is connected through a wiring 108 to the vertical driving circuit 105 and the horizontal driving circuit 106. The pixel array part 104 is formed with a column-like gate wiring 109 and a row-like signal wiring 110. The intersection part of both wirings is formed with a pixel electrode 111 and a thin film transistor TFT for driving the same. The gate electrode of the thin film transistor TFT is connected to the corresponding gate wiring 109. The drain region is connected to the corresponding pixel electrode 111. The source region is connected to the corresponding signal wiring 110. The gate wiring 109 is connected to the vertical driving circuit 105. The signal wiring 110 is connected to the horizontal driving circuit 106.

Figure 9:
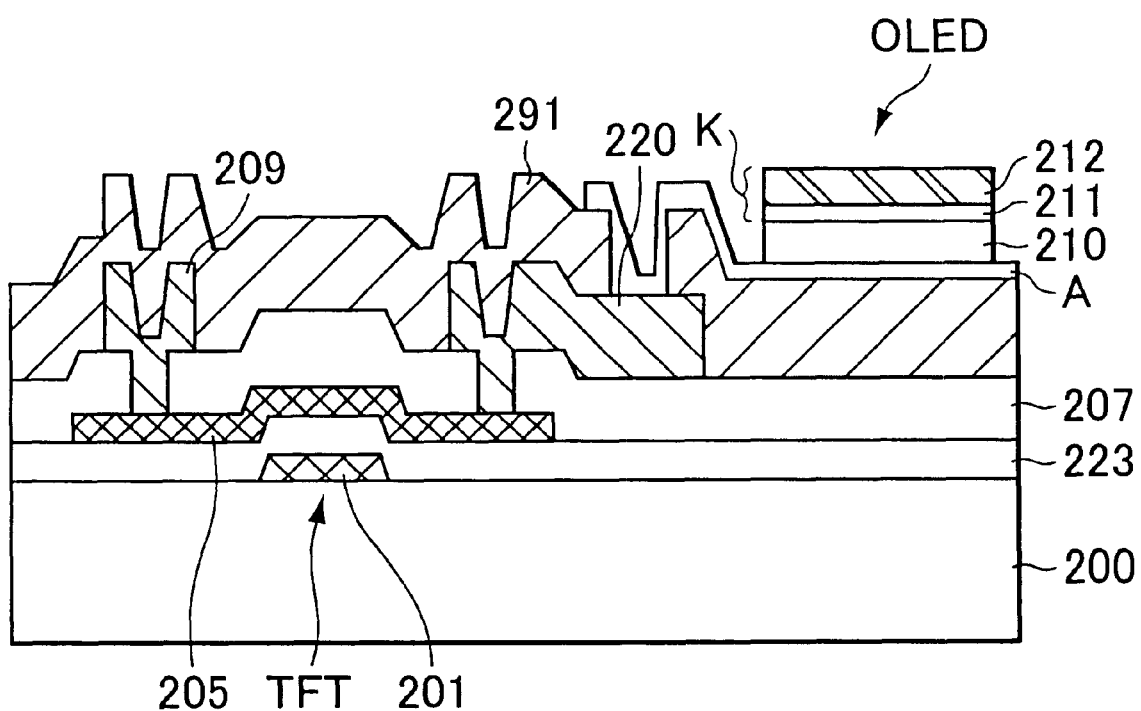
FIG. 9 is a partial cross-sectional view showing another example of the display panel produced in accordance with the present invention.

FIG. 9 is a schematic partial cross-section view showing another example of the display device produced in accordance with the present invention. In this embodiment, one substrate is used to produce an electroluminescence display device. When the panel is etched, preferably, the pixel part protected is immersed into HF so as to etch the glass substrate. In this embodiment, an organic electroluminescence element OLED is used as the pixel. As is illustrated, the OLED is constructed so that an anode A, an organic layer 210, and a cathode K are superposed in that order. The anode A separated for each pixel is made of, for example, chrome, and is basically photoreflective. The cathode K commonly connected between the pixels is, for example, of a lamination construction of a very thin metal layer 211 and a transparent conductive layer 212, and is basically light transmittance. A forward voltage (about 10V) is applied between the anode A and the cathode K of the OLED having such a construction. Carriers such as electrons or positive holes are implanted so that luminescence is observed. It is considered that the operation of the OLED provides the luminescence caused by exciters formed by the positive holes implanted from the anode A and the electrons implanted from the cathode K.

The thin film transistor TFT for driving the OLED has a gate electrode 201 formed on a substrate 200 made of glass, a gate insulating film 223 superposed on the top surface thereof, and a semiconductor thin film 205 superposed above the gate electrode 201 through the gate insulating film 223. The thin film transistor TFT has a source region S as the path of an electric current supplied to the OLED, a channel region Ch, and a drain region D. The channel region Ch is positioned directly above the gate electrode 201. The thin film transistor TFT having the bottom gate construction is coated by an interlayer insulating film 207. A wiring electrode 209 and a drain electrode 220 are formed thereon. The above-mentioned OLED is deposited on these through another interlayer insulating film 291. The anode A of the OLED is connected electrically to the thin film transistor TFT through the drain electrode 220.

What is claimed is:

1. A method for manufacturing a display panel comprising:
   a panel producing step for manufacturing a display panel using substrates each having a predetermined wall thickness; and
   a chemical treatment step for immersing the display panel into a chemical solution and removing a fixed amount of the surface of the substrates by a chemical reaction so as to reduce the wall thickness,
   wherein in said panel producing step, the display panel is produced by forming an electroluminescence element on one substrate having a predetermined thickness, and in said chemical treatment step, the display panel is immersed into the chemical solution while the electroluminescence element is protected, thereby removing a fixed amount of the surface of the one substrate.

2. The method for manufacturing a display panel according to claim 1, wherein in said chemical treatment step, the temperature change of the chemical solution is controlled so as to be within the range from a predetermined temperature to ±5° C., thereby removing a fixed amount of the surface of the substrates.

3. The method for manufacturing a display panel according to claim 2, wherein in said chemical treatment step, a predetermined temperature of the chemical solution is between 30° C. and 60° C.

4. The method for manufacturing a display panel according to claim 1, wherein in said chemical treatment step, the concentration change of the chemical solution is controlled so as to be within the range from a predetermined concentration to ±5 wt %, thereby removing a fixed amount of the surface of the substrates.

5. The method for manufacturing a display panel according to claim 4, wherein in said chemical treatment step, a predetermined concentration of the chemical solution is between 10 wt % and 30 wt %.

6. The method for manufacturing a display panel according to claim 1, wherein in said chemical treatment step, a substance precipitated by the chemical reaction is recovered from the chemical solution, thereby removing a fixed amount of the surface of the substrates.

7. The method for manufacturing a display panel according to claim 1, wherein in said chemical treatment step, the display panel is immersed into the chemical solution while circulating the chemical solution filled in a vessel, thereby removing a fixed amount of the surface of the substrates.

8. The method for manufacturing a display panel according to claim 1, wherein in said chemical treatment step, the display panel is immersed into the chemical solution while introducing bubbles into the chemical solution for stirring, thereby removing a fixed amount of the surface of the substrates.

9. The method for manufacturing a display panel according to claim 1, wherein in said chemical treatment step, the display panel is immersed into the chemical solution while swinging, thereby removing a fixed amount of the surface of the substrates.

10. The method for manufacturing a display panel according to claim 1, wherein between said panel producing step and said chemical treatment step, a foreign particle removing step for removing foreign particles deposited onto the substrates is performed.

11. The method for manufacturing a display panel according to claim 10, wherein in said foreign particle removing step, ozone water is exerted on the substrates to remove foreign particles.

12. The method for manufacturing a display panel according to claim 1, wherein after said chemical treatment step, pure water heated to 40° C. or higher is used to perform a chemical solution removing step for removing the chemical solution deposited onto the substrates.

13. The method for manufacturing a display panel according to claim 1, wherein said chemical treatment step includes a procedure for detecting whether a fixed amount of the surface of the substrates is removed or not.

14. The method for manufacturing a display panel according to claim 1, wherein in said chemical treatment step, the substrates made of glass are immersed into a chemical solution containing hydrofluoric acid and sulfuric acid, thereby removing a fixed amount of the surface thereof.

15. The method for manufacturing a display panel according to claim 1, wherein said panel producing step produces a display panel by superposing two substrates each having a predetermined wall thickness together by a predetermined gap, and after said chemical treatment step, a liquid crystal implanting step for implanting liquid crystals into the gap of the display panel is performed.

16. A display panel which is produced using substrates each having a predetermined wall thickness, wherein the display panel is immersed into a chemical solution to remove a fixed amount of the surface of the substrates by a chemical reaction so as to reduce the wall thickness of the substrates,
   wherein an electroluminescence element is formed on one substrate having a predetermined wall thickness, and the one substrate is immersed into the chemical solution while the electroluminescence element is protected, thereby removing a fixed amount of the surface of the one substrate.

17. The display panel according to claim 16, wherein the temperature change of the chemical solution is controlled so as to be within the range from a predetermined temperature to ±5° C., thereby removing a fixed amount of the surface of said substrates.

18. The display panel according to claim 17, wherein a predetermined temperature of the chemical solution is between 30° C. and 60° C., thereby removing a fixed amount of the surface of said substrates.

19. The display panel according to claim 16, wherein the concentration change of the chemical solution is controlled so as to be within the range from a predetermined concentration to ±5 wt %, thereby removing a fixed amount of the surface of said substrates.

20. The display panel according to claim 19, wherein a predetermined concentration of the chemical solution is between 10 wt % and 30 wt %, thereby removing a fixed amount of the surface of said substrates.

21. The display panel according to claim 16, wherein a substance precipitated by the chemical reaction is recovered from the chemical solution, thereby removing a fixed amount of the surface of said substrates.

22. The display panel according to claim 16, wherein the display panel is immersed into the chemical solution while circulating the chemical solution filled in a vessel, thereby removing a fixed amount of the surface of said substrates.

23. The display panel according to claim 16, wherein the display panel is immersed into the chemical solution while introducing bubbles into the chemical solution for stirring, thereby removing a fixed amount of the surface of said substrates.

24. The method for manufacturing a display panel according to claim 16, wherein the display panel is immersed into the chemical solution while swinging, thereby removing a fixed amount of the surface of said substrates.

25. The display panel according to claim 16, wherein before immersing the display panel into the chemical solution to remove a fixed amount of the surface of said substrates by the chemical reaction, foreign particles deposited onto the surface thereof are removed previously.

26. The display panel according to claim 25, wherein ozone water is exerted to previously remove foreign particles deposited onto the surface of said substrates.

27. The display panel according to claim 16, wherein pure water heated to 40° C. or higher is used to remove the chemical solution deposited onto the surface of said substrates.

28. The display panel according to claim 16, wherein the change of the wall thickness of said substrates is detected, thereby reducing a fixed amount of the surface of said substrates.

29. The display panel according to claim 16, wherein said substrates are made of glass and are immersed into a chemical solution containing hydrofluoric acid and sulfuric acid, thereby removing a fixed amount of the surface thereof.

30. The display panel according to claim 16, wherein two substrates each having a predetermined wall thickness are superposed together by a predetermined gap, and then, are immersed into the chemical solution to remove a fixed amount of the surface of the respective substrates, thereby implanting liquid crystals into the gap.

* * * * *